(12) United States Patent
Bálek et al.

(10) Patent No.: US 11,861,006 B2
(45) Date of Patent: Jan. 2, 2024

(54) HIGH-CONFIDENCE MALWARE SEVERITY CLASSIFICATION OF REFERENCE FILE SET

(71) Applicant: Avast Software s.r.o., Prague (CZ)

(72) Inventors: Martin Bálek, Teplice (CZ); Fabrizio Biondi, Prague (CZ); Dmitry Kuznetsov, Prague (CZ); Olga Petrova, Vrsovice (CZ)

(73) Assignee: Avast Software s.r.o., Prague (CZ)

( * ) Notice: Subject to any disclaimer, the term of this patent is extended or adjusted under 35 U.S.C. 154(b) by 257 days.

(21) Appl. No.: 17/151,462

(22) Filed: Jan. 18, 2021

(65) Prior Publication Data

US 2022/0229906 A1    Jul. 21, 2022

(51) Int. Cl.
*H04L 29/06* (2006.01)
*G06F 21/56* (2013.01)
*G06N 20/00* (2019.01)
*G06F 21/54* (2013.01)
*G06F 18/21* (2023.01)

(52) U.S. Cl.
CPC .......... *G06F 21/566* (2013.01); *G06F 18/217* (2023.01); *G06F 21/54* (2013.01); *G06F 21/568* (2013.01); *G06N 20/00* (2019.01)

(58) Field of Classification Search
CPC ...... G06F 21/566; G06F 21/54; G06F 21/568; G06N 20/00; G06K 9/6262
See application file for complete search history.

(56) References Cited

U.S. PATENT DOCUMENTS

| | | | | |
|---|---|---|---|---|
| 9,245,123 | B1 * | 1/2016 | Satish | G06F 21/50 |
| 9,805,192 | B1 * | 10/2017 | Gates | G06F 21/562 |
| 2012/0260343 | A1 * | 10/2012 | Sun | G06F 21/564 |
| | | | | 726/24 |
| 2017/0357807 | A1 * | 12/2017 | Harms | H04L 63/1425 |
| 2021/0019408 | A1 * | 1/2021 | Chrysaidos | G06F 21/566 |

OTHER PUBLICATIONS

Kantchelian, Alex, et al. Better Malware Ground Truth: Techniques for Weighting Anti-Virus Vendor Labels. AISec'15, Oct. 16, 2015, Denver, CO. pp. 45-56. Accessed at: http://dx.doi.org/10.1145/2808769.2808780.

(Continued)

*Primary Examiner* — Evans Desrosiers
(74) *Attorney, Agent, or Firm* — AVEK IP, LLC; Mark C. Young; William B. Kircher

(57) ABSTRACT

A reference file set having high-confidence malware severity classification is generated by selecting a subset of files from a group of files first observed during a recent observation period and including them in the subset. A plurality of other antivirus providers are polled for their third-party classification of the files in the subset and for their third-party classification of a plurality of files from the group of files not in the subset. A malware severity classification is determined for the files in the subset by aggregating the polled classifications from the other antivirus providers for the files in the subset after a stabilization period of time, and one or more files having a third-party classification from at least one of the polled other antivirus providers that changed during the stabilization period to the subset are added to the subset.

20 Claims, 4 Drawing Sheets

(56) References Cited

OTHER PUBLICATIONS

Du, Pang, et al. Statistical Estimation of Malware Detection Metrics in the Absence of Ground Truth. IEEE Transactions on Information Forensics and Security, vol. 13, No. 12. Dec. 2018. pp. 2965-2980. Accessed at: http://www.ieee.org/publications_standards/publications/rights/index.html.

Hurier, Mederic, et al. On the Lack of Consensus in Anti-Virus Decisions: Metrics and Insights on Building Ground Truths of Android Malware. In: Caballero J., Zurutuza U., Rodríguez R. (eds) Detection of Intrusions and Malware, and Vulnerability Assessment. DIMVA 2016: pp. 122-141. Lecture Notes in Computer Science, vol. 9721. Springer, Cham. https://doi.org/10.1007/978-3-319-40667-1_8.

Wei, Fengguo, et al. Deep Ground Truth Analysis of Current Android Malware. In: Polychronakis M., Meier M. (eds) Detection of Intrusions and Malware, and Vulnerability Assessment. DIMVA 2017. Lecture Notes in Computer Science, vol. 10327. pp. 252-276. Springer, Cham. https://doi.org/10.1007/978-3-319-60876-1_12.

\* cited by examiner

HIGH-CONFIDENCE MALWARE SEVERITY CLASSIFICATION OF REFERENCE FILE SET

FIELD

The invention relates generally to security in computerized systems, and more specifically to high-confidence classification of the malware severity of files in a reference file set.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, antivirus software installed on a personal computer or in a firewall may use characteristics of known malicious data to look for other potentially malicious data, and block it. In a personal computer, the user is typically notified of the potential threat, and given the option to delete the file or allow the file to be accessed normally. A firewall similarly inspects network traffic that passes through it, permitting passage of desirable network traffic while blocking undesired network traffic based on a set of rules. Tools such as these rely upon having an accurate and robust ability to detect potential threats, minimizing the number of false positive detections that interrupt normal computer operation while catching substantially all malware that poses a threat to computers and the data they handle.

But, training a malware detection engine relies upon a robust set of known malicious and known clean files, both to appropriately train a malware detection engine to detect malicious files with a high degree of accuracy and to provide an accurate means to test various methods of malware detection for their effectiveness. It is therefore desirable to provide a reference file set having high-confidence malware severity classification.

SUMMARY

One example embodiment of the invention comprises a method of generating a reference file set having high-confidence malware severity classification. A subset of files is selected for inclusion in the subset from a group of files first observed during a recent observation period. A plurality of other antivirus providers are polled for their third-party classification of the files in the subset of files and for their third-party classification of a plurality of files from the group of files not in the subset. A malware severity classification is determined for the files in the subset by aggregating the polled classifications from the other antivirus providers for the files in the subset after a stabilization period of time, and one or more files having a third-party classification from at least one of the polled other antivirus providers that changed during the stabilization period to the subset are added to the subset.

In a further example, one or more files are added to the subset of files and are selected to improve representation of malware types seen during recent observation period in a distribution of malware types in the subset.

In another example, the effectiveness of an anti-malware algorithm is estimated using a reference file subset such as in the examples described herein by testing the anti-malware algorithm against a the reference file subset and evaluating the accuracy of the malware algorithm in characterizing a malware severity of each file in the reference set.

The details of one or more examples of the invention are set forth in the accompanying drawings and the description below. Other features and advantages will be apparent from the description and drawings, and from the claims.

DETAILED DESCRIPTION

Figure 1:
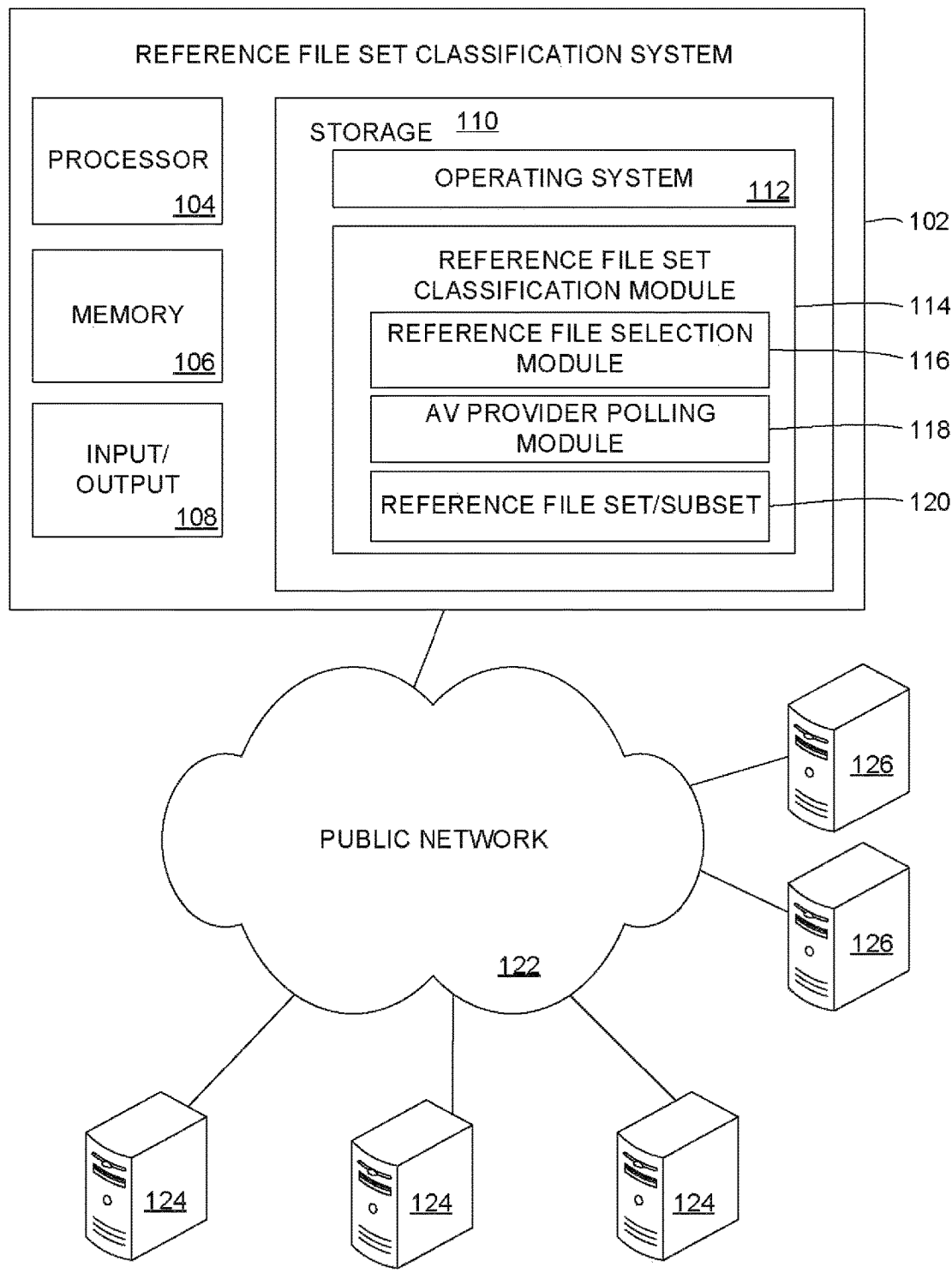
FIG. 1 shows a reference file set classification system, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing information from a computer or using the computer for unintended purposes. But, with new threats constantly emerging, efficient and timely detection of vulnerabilities within computerized systems and IoT devices such as a home appliance remain a significant challenge. New anti-malware algorithms, artificial intelligence networks or systems, and other such solutions are therefore constantly under development.

Determining the effectiveness of an anti-malware algorithm typically involves experimentally measuring how well the algorithm performs against a number of know malicious and known benign files, such that the detection rate is acceptably high and the rate of false positive detections is acceptably low. Performing such tests relies in part upon knowing with a high degree of confidence whether a given file is malicious or benign, and in more detailed examples the type of threat or the relative severity a malicious file poses. But, because threats are constantly changing, having an up-to-date set of known malicious and known benign files, along with characteristics such as the type or severity of threat posed, is a significant challenge. Manual inspection or analysis of a file set is very labor-intensive, and may still be prone to errors based on the skill of the person doing the analysis and the obfuscation techniques employed by the malware designer.

Further, a reference set of known malicious and known benign files is desirably representative of the types of malware that are currently seen in the real world, including having a distribution of severities, distribution of malware types and families, and other metrics of interest that match what an anti-malware tool will encounter while in actual use. Malware that is particularly complex or obfuscated should not be eliminated from the reference file set, as performance of an anti-malware tool that is only effective against relatively simple malware is not as meaningful as performance against a full range of threats. Similarly, the reference set should be large enough that the various types of malware that may be encountered are represented in the reference set in a statistically significant way, using samples that reflect an up-to-date picture of real-world threats.

Some examples described herein therefore seek to improve upon construction of reference or "ground truth" sets of files for use in malware detection, using various techniques to address problems such as those described above. In one such example, a method of generating a reference file set having high-confidence malware severity classification includes randomly selecting a subset of files from a group of files first observed during a recent observation period, ensuring the file set is a good statistical representation of recently observed real-world threats. Other antivirus providers are polled for their classification of the files in the subset, and for their classification of files from at least some files not in the subset. In one embodiment, files for which it is not possible to achieve a high-confidence label are not included in the reference or "ground truth" sets of files. A malware severity classification for the files in the subset is determined by aggregating the polled classifications from the other antivirus providers for the files in the subset after a stabilization period of time, which in some examples is between two days and a week.

To improve the performance of the subset of files, additional files are added to the subset if their third-party classification from at least one of the polled other antivirus providers has changed during the stabilization period, ensuring that the subset adequately reflects files that are more difficult to classify. Similarly, one or more additional files are selected to be added to the subset to improve representation of malware types seen during the recent observation period by making the distribution of malware types in the subset better reflect what has been observed in recent real-world file collection.

In a more detailed example, the subset and malware severity classifications for the subset are characterized as immutable truth for the recent observation period for purposes of future testing, such that different anti-malware algorithms or methods can be reliably compared to one another for their relative performance against malware of a certain observation period or date range. The recent observation period comprises in some examples a period of one day to one week, while the stabilization period is desirably somewhat longer to allow time for mischaracterized files first seen on a certain date to be correctly recharacterized, such as a period of two days to one week.

FIG. 1 shows a reference file set classification system, consistent with an example embodiment. Here, a network device such as reference file set classification system 102 comprises a processor 104, memory 106, input/output elements 108, and storage 110. Storage 110 includes an operating system 112, and a reference file set classification module 114 that is operable to select and classify files in a reference file set as may be used to evaluate the effectiveness of antivirus/antimalware software in detecting malicious files while avoiding false positive detections. The reference file set classification module 114 further comprises reference file selection module 116, which is operable to select a subset of files from a set of files recently observed for the first time for inclusion in the reference file set. The reference file set classification module also includes an antivirus provider polling module 118 that is operable to poll other antivirus providers for their classification of files in the reference file set and/or reference file subset, as well as a database or other data structure that holds the reference file set and subset as shown at 120.

The reference file set classification system 102 is connected to a public network 122 such as the Internet, which facilitates communication with other computer systems such as to observe file traffic from network computers 124 and to poll third-party antivirus providers 126 for their classification of files first observed from computers such as 124 during a recent observation period. In other examples, some or all features of the system of FIG. 1 are distributed among multiple computers, or are omitted from the system and/or performed by other parties, such as third-party observation and collection of new files first observed during the recent observation period.

In operation, a reference file subset is selected and classified from a reference file set of files observed for the first time during a recent observation period such as from networked computers 124 on public network 122, such as those files first observed over the last day, several days, week, or the like. Reference file selection module 116 initially randomly selects a subset of files from the larger file set of observed files, both of which are stored at 120 of FIG. 1. Other antivirus providers 126 are polled for their classification of files selected to be in the subset by the antivirus provider polling module 118, and these characterizations are stored along with the subset of files in 120. The reference file selection module 116 determines a malware severity classification for the files in the subset by aggregating the polled classifications from the other antivirus providers after a stabilization period of time, such as one day, two days, three days, five days, a week, or the like after the file is first observed.

One or more additional files from the set of files first observed during the recent observation period are added to the subset based on their classification from a third-party antivirus provider changing during the stabilization period, as such a change may indicate that the file is particularly complex or difficult to classify. Adding such files to the subset increases the robustness of the subset of files in representing malware that is particularly difficult to detect, such as new or emerging threats or files that are obfuscated to avoid detection. Similarly, one or more additional files from the set of files first observed during the recent observation period are added to the subset to improve statistical representation of malware types seen during the recent observation period, such as if, for example, the number of malware files including ransomware in the subset underrepresents the frequency with which malicious files including ransomware are present in the overall file set of files first observed during the recent observation period. A malware severity classification is also determined for each of the files added to the subset, using a similar process of polling third-party antivirus providers using AV provider polling module 118.

Once the reference file subset and the classification of files in the reference file subset is complete, the reference file subset stored at 120 and can be used as a reference or "ground truth" to compare the relative performance of different malware or antivirus detection algorithms or systems. Because the reference file set is fixed and does not change once it is established for a given time period, other malware or antivirus algorithms can be tested against the reference file subset at a later date and still provide meaningful results for the selected observation period represented by the reference file subset.

In a more detailed example, the relative effectiveness of different anti-malware algorithms or systems can be compared for malware first observed during a specific observation period by evaluating the performance of the various algorithms or systems against a reference subset or subsets of files constructed such as described above, where the observation period or periods of the selected subset or subsets represent a particular period of interest. A new algorithm that performs well against a recent set of malware files, for example, can be compared with other algorithms against less recent sets of malware files or against significant historical events or changes in the malware environment, using historic data including prior tests against reference subsets from prior dates using preexisting algorithms. Tools such as this facilitate development of better algorithms and a better understanding of how different algorithms perform in different malware environments.

Figure 2:
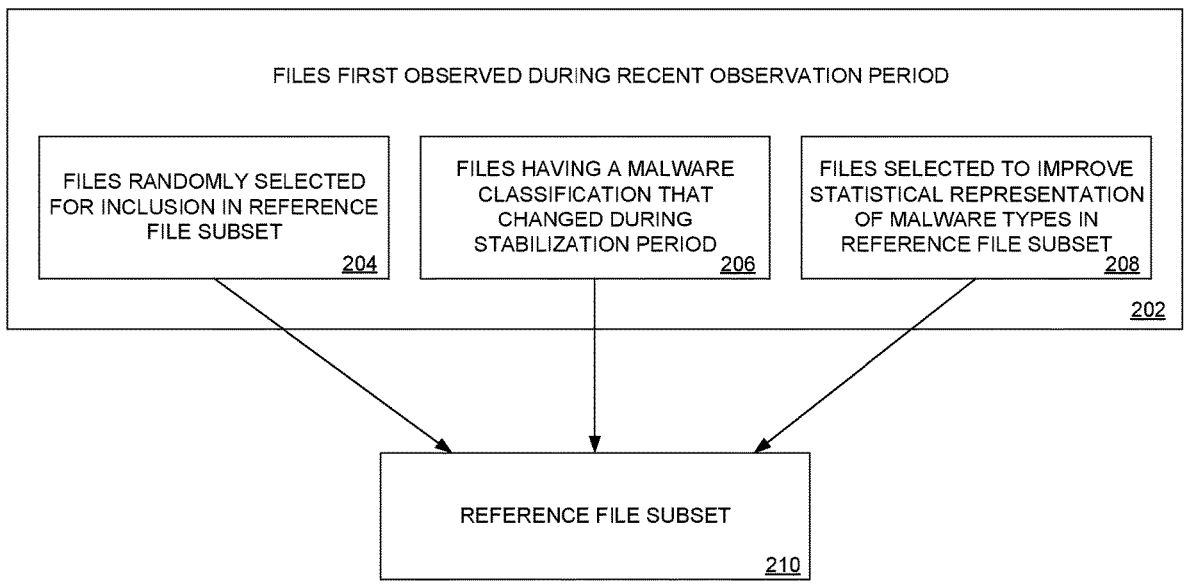
FIG. 2 is a block diagram showing construction of a reference file subset of malware files from a larger group of observed files, consistent with an example embodiment.

FIG. 2 is a block diagram showing construction of a reference file subset of malware files from a larger group of observed files, consistent with an example embodiment. Here, files observed for the first time during a recent observation period, such as the last day, last several days, last week, or the like are assembled at 202 into a group of files first observed during the recent observation period. From this group of files at 202, a subset is randomly selected at 204. The subset is selected to be large enough to be a good statistical representation of the types of file found in the file group 202, both benign and malicious, and representing various types of malware found in the file group 202. In other examples, random selection is replaced with other methods of selection, such as simply selecting the first files in the group, selecting every tenth file until a sufficient number of files are selected, or any other reasonable method of selecting a subset of files in the file group 202 to serve as a core part of reference file subset 210. I some examples, the group of files and the subset comprise both files determined to be malware and files that are benign, such that the file sets may be further used to determine the ability of an antivirus algorithm to avoid false positive malware detections.

For each of the files in the reference subset, multiple sources of malware severity labels are polled to determine their malware classifications assigned to the files. In a more detailed example, classification includes type of file, such as benign, potentially unwanted program, known malware such as a remailer, botnet, ransomware, and the like. In a further example, the degree of harm posed by such a file is also characterized, such as on a scale from benign through severe. These various malware classifications are received from each of multiple sources that has analyzed the files in the reference file subset 210, and in a further example for each of the files in the larger file group 202 from which the reference file subset is selected.

Files having a malware classification from other sources that has changed during a recent stabilization period, such as over two days, three days, five days, a week, or the like of polling the third party providers are considered to be potentially more complex or sophisticated than other files, and so at 206 are further selected for inclusion in the reference file subset. This improves the representation of complex malware files in the reference file subset 210, along with including benign files that are complex and more difficult to distinguish from malware. For example, benign files that have been obfuscated to prevent illegal copying or modification such as "hacking" licensed software may resemble malware that is often similarly obfuscated. Because an antivirus algorithm or system that can distinguish complex malicious and benign files from one another is more robust and more desirable than one that cannot, the representation of such complex files 206 in the reference file subset 210 improves the quality of reference file subset 210 for purposes of characterizing or distinguishing the ability of various algorithms or systems to detect malware while avoiding false positives.

The reference file subset is then statistically analyzed for representation of various types of files, such as various classes of malware and benign files, as is the larger group of files 202. If the statistical distribution of files in the reference file subset 210 deviates more than an acceptable threshold amount from the distribution of files in the larger file group 202, additional files from the larger file group 202 having the needed file characteristics are selected at 208 for inclusion in the reference file set. This results in a reference file set that is representative of the types of files found in the larger file group 202, but which is skewed toward inclusion of files with greater complexity or that are more difficult to classify.

Figure 3:
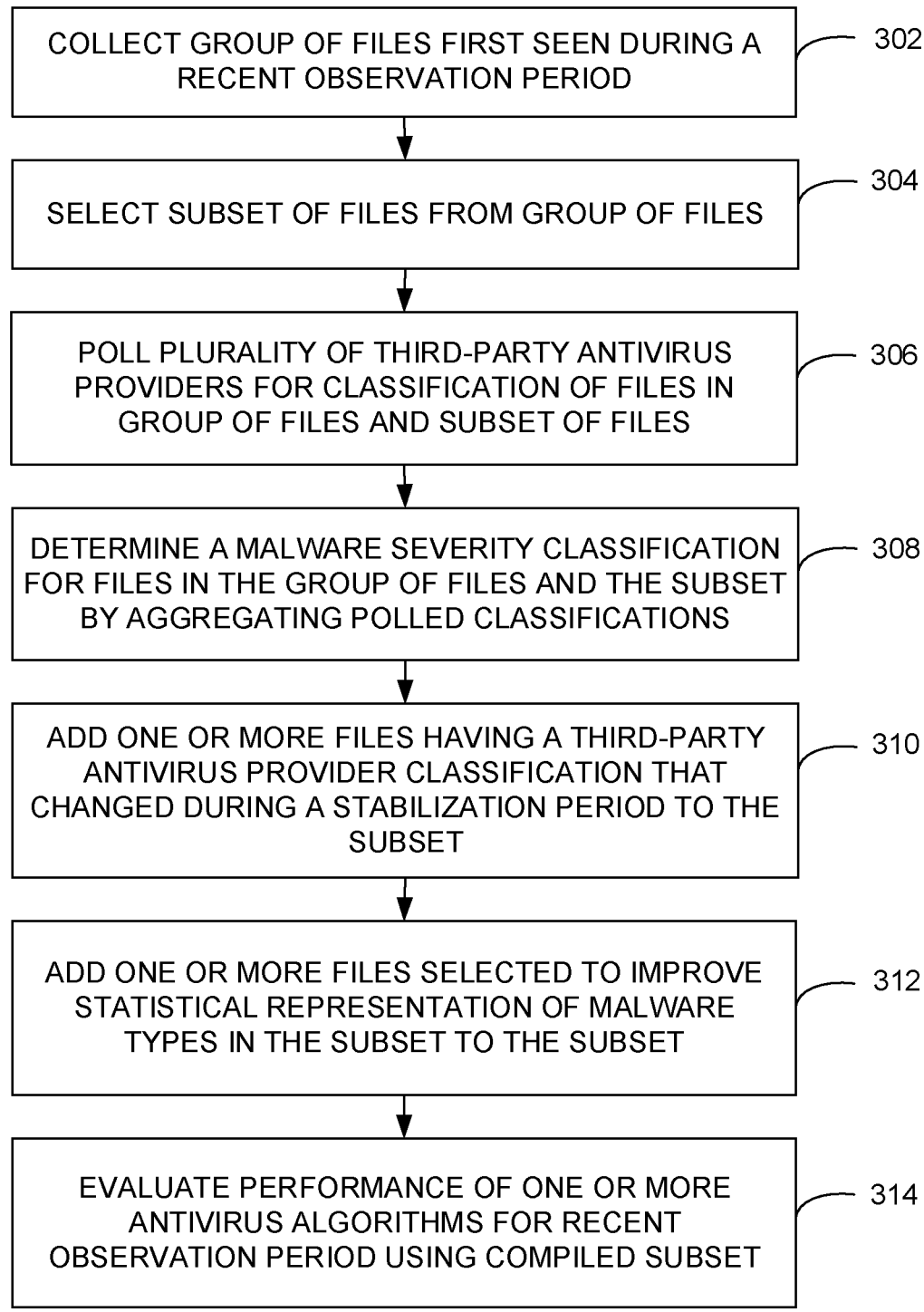
FIG. 3 is a flowchart of a method of characterizing the performance of an antivirus algorithm using a reference file subset, consistent with an example embodiment

FIG. 3 is a flowchart of a method of characterizing the performance of an antivirus algorithm using a reference file subset, consistent with an example embodiment. At 302, files observed for the first time are collected, such as files observed on websites, file sharing sites, files passing through firewalls, files encountered by antivirus software, or through other file detection means. The files are collected for a certain defined observation period, such as for a specific day, two days, three days, five days, a week, or similar, such that the group of files represents files newly encountered during the selected observation period. From this group of collected files, a subset of files is selected at 304.

The subset of files in some examples is selected randomly, but any suitable method for obtaining a subset of a desired number of files that appropriately represents the collected group of files may be used in other embodiments. In a further example, the number of times each file is encountered during the observation period is also recorded with the group of files, and is used in selecting a subset of files such as to increase the odds of a file being selected for inclusion in the subset if it is encountered more frequently during the observation period.

Other antivirus providers are polled at 306 for their evaluations or classifications of the files in the group of files and in the subset of files, and such data is processed such as to normalize or aggregate the data using a common ranking system. The data desirably includes information such as a type of file (e.g., benign, potentially unwanted program, ransomware, virus, rootkit, etc.) as well as a severity or threat level (e.g., benign, mild, moderate, severe, etc.). From this collected data, a malware severity classification for each file is determined at 308, such as by using statistical analysis, artificial intelligence or machine learning, or other suitable means.

The subset is enhanced at 310 by addition of one or more files from the group collected at 302 having third-party antivirus classifications that changed during a stabilization period to the subset. The stabilization period in various examples is two days, three days, five days, a week, or another suitable length of time after first observation and classification as may be determined experimentally or chosen by other methods. The files with classifications that changed during the stabilization period are considered likely to be more complex or more difficult to classify than a typical file in the group due to the change in classification, and so including these files in the subset enhances representation of more complex or difficult files to classify in the subset.

Similarly, one or more files are selected from the group of files first observed during the recent observation period for inclusion in the subset at 312 based on statistical analysis of the group of files and of the subset, such that the files are selected to improve statistical representation of one or more types of files in the subset so that it better represents the overall group. For example, if seven percent of the malicious files in the group are ransomware files but only four percent of malicious files in the subset are ransomware, additional files classified as ransomware are selected from the group for inclusion in the subset. In a further example, if multiple classifications of file are statistically represented beyond a threshold of difference (such as one percent, five percent, or the like) between the group and the subset, files are chosen from the group for inclusion in the subset taking more than one classification or characteristic in mind. In one such example, ransomware files that are classified as moderate risk may be selected over files classified as severe risk if moderate risk files are underrepresented in the subset.

Once the subset has been enhanced with the addition of select files at 310 and 312, the subset is complete and can be used as a reference subset for characterization of the performance of antivirus algorithms or systems as shown at 314. More specifically, the performance of various algorithms against files characteristic of the observation period can be compared to one another, including comparing them at different points in time, as the reference subset for the observation period identified at 302 does not change once it is established. By fixing the reference subset as a "ground truth" reference for a certain point or period in time, later algorithms or enhancements can be reliably compared against prior algorithms against what is known to be the same reference subset, allowing the antivirus researcher or developer to accurately characterize performance of new algorithms against both new threats and threats characteristic of different prior times through use of historic reference subsets.

As described herein, the method of the present invention provides a highly-reliable and representative "ground truth" adaptable to evaluate either a single system or for comparing multiple systems, allowing a user to ascertain system performance and provide insight into strengths and weaknesses of the system, resulting in more accurate labeling of malware. The method may further be employed in the training of AI-based malware labeling systems.

Figure 4:
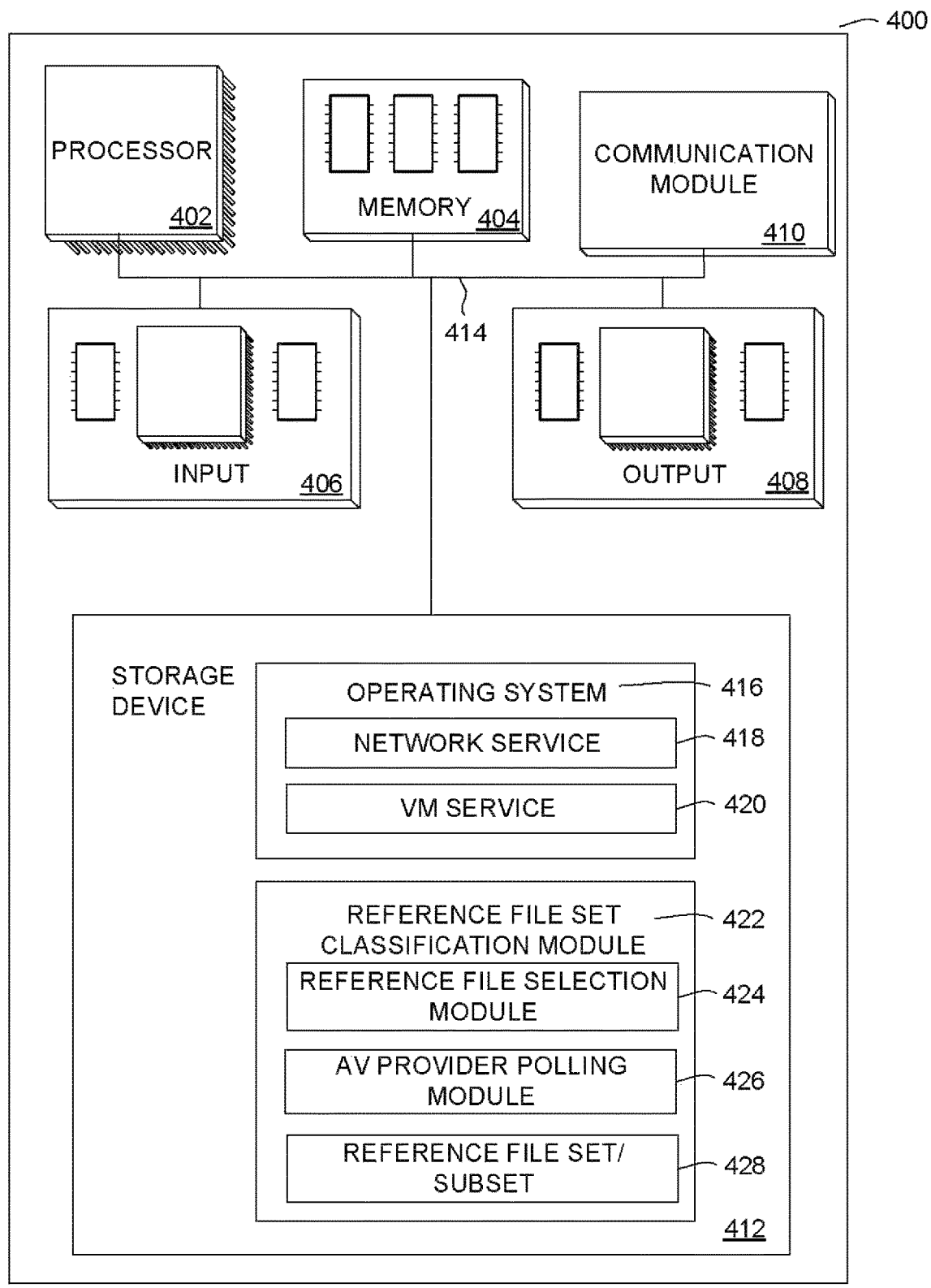
FIG. 4 is a computerized malware characterization system, consistent with an example embodiment of the invention

In some example embodiments, the systems, methods, and techniques described herein are performed on one or more computerized systems. Such computerized systems are able in various examples to perform the recited functions such as collecting file data, analyzing and selecting files from the collected file group to form a subset, and other such tasks by executing software instructions on a processor, and through use of associated hardware. FIG. 4 is one example of such a computerized malware characterization system. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412.

Computing device 400 in one example further includes an operating system 416 executable by computing device 400. The operating system includes in various examples services such as a network service 418 and a virtual machine service 420 such as a virtual server or virtualized honeypot device. One or more applications, such as reference file set classification module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as reference file set classification module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as communication module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to wirelessly communicate with an external device such as via public network 122 of FIG. 1.

Computing device 700 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as reference file set classification module 422 to components of computing device 400. For example, operating system 416, in one example, facilitates the communication of various applications such as reference file set classification module 422 with processors 402, communication unit 410, storage device 412, input device 406, and output device 408. Applications such as reference file set classification module 422 may include program instructions and/or data that are executable by computing device 400. As one example, reference file set classification module 422 selects files for inclusion in a reference file subset using reference file selection module 424, polls third-party antivirus providers for their classification of newly observed files using antivirus provider polling module 426, and performs stores the reference file subset and general file sets at 428. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of generating a reference file set having high-confidence malware severity classification, comprising:
  selecting a subset of files from a group of files first observed during a recent observation period;
  polling a plurality of other antivirus providers for their third-party classification of the files in the subset of files and for their third-party classification of a plurality of files from the group of files not in the subset;
  determining a malware severity classification for the files in the subset by aggregating the polled classifications from the other antivirus providers for the files in the subset after a stabilization period of time; and adding one or more files having a third-party classification from at least one of the polled other antivirus providers that changed during the stabilization period to the subset.

2. The method of generating a reference file set having high-confidence malware severity classification of claim 1, further comprising adding one or more files to the subset of files selected to improve representation of malware types seen during recent observation period in a distribution of malware types in the subset.

3. The method of generating a reference file set having high-confidence malware severity classification of claim 2, wherein malware types comprise at least one of malware families, malware having similar functions, and malware having similar severity.

4. The method of generating a reference file set having high-confidence malware severity classification of claim 1, further comprising determining a malware severity classification for the one or more added files having a third-party classification that changed during the stabilization by aggregating the polled classifications from the other antivirus providers for the one or more added files.

5. The method of generating a reference file set having high-confidence malware severity classification of claim 1, further comprising assigning the subset and malware severity classifications for the subset as immutable truth for the recent observation period for purposes of future testing.

6. The method of generating a reference file set having high-confidence malware severity classification of claim 1, wherein the recent observation period comprises a day, three days, or a week.

7. The method of generating a reference file set having high-confidence malware severity classification of claim 1, wherein selecting the subset of files from the group of files is done randomly.

8. The method of generating a reference file set having high-confidence malware severity classification of claim 1, wherein the stabilization period comprises a period of two days to one week.

9. The method of generating a reference file set having high-confidence malware severity classification of claim 1, wherein determining classification further comprises using at least one of majority voting, statistical estimation, and machine learning using third-party classification of the files from the polled third-party antivirus providers.

10. The method of generating a reference file set having high-confidence malware severity classification of claim 1, wherein adding one or more files having a third-party classification from at least one of the polled other antivirus providers that changed during the stabilization period to the subset comprises adding all files having a third-party classification from at least one of the polled other antivirus providers that changed during the stabilization period.

11. The method of generating a reference file set having high-confidence malware severity classification of claim 1, wherein adding one or more files having a third-party classification from at least one of the polled other antivirus providers that changed during the stabilization period to the subset increases the percentage of files in the subset that are more difficult to classify, thereby improving complexity of the subset.

12. A method of estimating the effectiveness of an anti-malware algorithm, comprising:
testing the anti-malware algorithm against a reference file set; and
evaluating the accuracy of the malware algorithm in characterizing a malware severity of each file in the reference set;
wherein the reference file set is constructed by:
selecting a subset of files from a group of files first observed during a recent observation period;
polling a plurality of other antivirus providers for their third-party classification of the files in the subset of files and for their third-party classification of a plurality of files from the group of files not in the subset;
determine a malware severity classification for the files in the subset by aggregating the polled classifications from the other antivirus providers for the files in the subset after a stabilization period of time; and
adding one or more files having a third-party classification from at least one of the polled other antivirus providers that changed during the stabilization period to the subset.

13. The method of estimating the effectiveness of an anti-malware algorithm of claim 12, wherein the reference file set is further constructed by adding one or more files to the subset of files selected to improve representation of malware types seen during recent observation period in a distribution of malware types in the subset.

14. The method of estimating the effectiveness of an anti-malware algorithm of claim 12, wherein the reference file set is further constructed by determining a malware severity classification for the one or more added files having a third-party classification that changed during the stabilization by aggregating the polled classifications from the other antivirus providers for the one or more added files.

15. The method of estimating the effectiveness of an anti-malware algorithm of claim 12, wherein the recent observation period comprises a period of one day to one week, and the stabilization period comprises a period of two days to one week.

16. A method of generating a reference file set having high-confidence malware severity classification, comprising:
selecting a subset of files from a group of files first observed during a recent observation period;
polling a plurality of other antivirus providers for their third-party classification of the files in the subset of files and for their third-party classification of a plurality of files from the group of files not in the subset;
determining a malware severity classification for the files in the subset by aggregating the polled classifications from the other antivirus providers for the files in the subset after a stabilization period of time;
adding one or more first additional files to the subset having a third-party classification from at least one of the polled other antivirus providers that changed during the stabilization period;
adding one or more second additional files to the subset selected to improve representation of malware types seen during recent observation period in a distribution of malware types in the subset;
determining a malware severity classification for the one or more first and second additional files added to the subset by aggregating the polled classifications from the other antivirus providers for the added files.

17. The method of generating a reference file set having high-confidence malware severity classification of claim 16, further comprising assigning the subset and malware severity classifications for the subset as immutable truth for the recent observation period for purposes of future testing.

18. The method of generating a reference file set having high-confidence malware severity classification of claim 16, wherein the recent observation period comprises a period of one day to one week, and the stabilization period comprises a period of two days to one week.

19. The method of generating a reference file set having high-confidence malware severity classification of claim 16, wherein adding one or more files having a third-party classification from at least one of the polled other antivirus providers that changed during the stabilization period to the subset comprises adding all files having a third-party classification from at least one of the polled other antivirus providers that changed during the stabilization period.

20. The method of generating a reference file set having high-confidence malware severity classification of claim 16, wherein adding one or more first additional files having a third-party classification from at least one of the polled other antivirus providers that changed during the stabilization period to the subset increases the percentage of files in the subset that are more difficult to classify, thereby improving complexity of the subset.

\* \* \* \* \*